United States Patent [19]

Nishi et al.

[11] Patent Number: 4,668,055
[45] Date of Patent: May 26, 1987

[54] LENS FOR AN OPTICAL RECORDING/REPRODUCING APPARATUS AND OPTICAL RECORDING/REPRODUCING APPARATUS USING SAME

[75] Inventors: Hisami Nishi, Nishinomiya; Minoru Toyama, Takarazuka, both of Japan

[73] Assignee: Nippon Sheet Glass Co., Ltd., Japan

[21] Appl. No.: 800,753

[22] Filed: Nov. 22, 1985

[30] Foreign Application Priority Data

Dec. 10, 1984 [JP] Japan .................. 59-260410

[51] Int. Cl.$^4$ ............................................. G02B 13/18
[52] U.S. Cl. .................................................. 350/432
[58] Field of Search ........................................ 350/432

[56] References Cited

U.S. PATENT DOCUMENTS 934,579 9/1909 Straubel et al. ............. 350/432
4,613,212 9/1986 Norikazu ...................... 350/432

*Primary Examiner*—John K. Corbin
*Assistant Examiner*—Rebecca D. Gass
*Attorney, Agent, or Firm*—McDougall, Hersh & Scott

[57] ABSTRACT

In a lens for an optical recording/reproducing apparatus of the invention, a refractive index n(r) at a position of a distance r from an optical axis along a radial direction is given by:

$$n^2(r) = n_O^2 \{1 - (g \cdot r)^2 + h_4(g \cdot r)^4 + h_6(g \cdot r)^6 + h_8(g \cdot r)^8 + \ldots\}$$

and the following conditions are satisfied:
$R_2 = \infty$ $3.0 \geq R_1/(1 + 0.75S) \geq 0.8$ $1.40 \leq n_O \leq 1.87 - 0.6 g \cdot S$ $0.75 \geq g \cdot f \geq 0.45$ where
$n_O$: refractive index on the optical axis
$g, h_4, h_6, h_8$: coefficients
$R_1$: radius of curvature of a first surface
$R_2$: radius of curvature of a second surface
S: working distance
f: focal distance of an overall optical system at an image side.

An optical recording/reproducing apparatus of the invention has a lens as described above as an objective lens.

6 Claims, 8 Drawing Figures

LENS FOR AN OPTICAL RECORDING/REPRODUCING APPARATUS AND OPTICAL RECORDING/REPRODUCING APPARATUS USING SAME

BACKGROUND OF THE INVENTION

1. Field of the Invention

The present invention relates to a lens used in an optical recording/reproducing apparatus such as an optical disk system or an optomagnetic disk system and to an optical recording/reproducing apparatus using such a lens.

2. Description of the Prior Art

In an optical disk system as shown in FIG. 1, a beam 2 emitted from a light source 1 is transmitted through a beam splitter 3 and is collimated into a parallel beam by a collimator lens 4. The beam 2 is then focused onto a recording surface 6A of an optical disk 6 by an objective lens 5.

The beam 2 reflected by the recording surface 6A is converted into a parallel beam by the objective lens 6 and becomes incident on a photodetector 7 through the collimator lens 4 and the beam splitter 3.

When tracking control in such an optical disk system is performed by a 3-spot method, the beam 2 emitted from the light source 1 is split into three beams by a diffraction grating 8, and the three beams are focused onto the recording surface 6A.

In this case, two auxiliary beams among the three beams become incident on positions of the objective lens 5 other than its optical axis. Therefore, unless monochromatic aberration including not only spherical aberration but also coma and so on are sufficiently corrected, high-density recording/reproduction cannot be performed.

Even if a single beam 2 is used, unless the coma and so on of the objective lens 5 are sufficiently corrected, extremely high precision is required in assembly of the apparatus, resulting in an expensive apparatus.

In order to improve the response characteristics of an optical pickup to focusing and tracking control, the objective lens 5 must be compact in size and light in weight.

As an example of such an objective lens 5, a compound lens of 2-group 3-lens configuration and of a general optical glass having a uniform refractive index is widely used, as described in Japanese Patent Disclosure No. 55-4068.

However, this type of lens has a large number of surfaces (6 in all) to be polished, and requires assembly and centering of respective lens components. Thus, such a lens requires a large number of steps and manufacturing cost cannot be reduced. If a plurality of lens groups are used as in this type of lens, a lens barrel must be used, additionally preventing a light and compact lens.

In order to satisfy demand for a light and compact lens, a single nonspherical lens has been proposed which consists of a plastic material having a uniform refractive index, as described in Japanese Patent Disclosure No. 50-156945.

This lens can be manufactured at low cost by utilizing a molding technique. However, since the medium is a plastic material, the lens is subject to problems of low resistance to humidity and heat. The lens is also easily scratched and provides only low reliability. An aspherical lens consisting of glass is extremely expensive to polish and has not been used in practice to date.

A graded index lens has been proposed as a solution to problems with a lens consisting of a medium having a uniform refractive index. For example, U.S. Pat. No. 3,729,253 describes a single spherical lens which has a refractive index gradient along the radial direction so that the spherical aberration, coma and astigmatism of 3rd order are reduced.

However, in this lens, spherical aberration of high order, i.e., 5th or higher is not considered, though the lens is in fact subject to additional spherical aberration of a high order. For this reason, imaging characteristics on the lens optical axis are poor, and the lens is not suitable for an optical disk system or the like which requires a high numerical aperture.

A lens for an optical disk system or the like must have a substantially zero spherical aberration of each order, must be able to focus the diffraction spot on the axis to a degree equivalent to the diffraction limit, and must have an rms value of wavefront aberration of about $0.07\lambda$ or less.

Japanese Patent Disclosure No. 55-6354 describes a design of a lens which can reduce spherical aberration and which is for use in a video disk.

In such a lens, only correction for spherical aberration is performed, and the sine condition representing the coma is not satisfied. In an embodiment of this lens, since a radius of curvature $R_2$ of a second surface is negative and the second surface has a convex shape, the deficiency amount of the Abbe's sine condition is increased with a decrease in $|R_2|$. The field of view is also limited due to coma. For these reasons, this lens is not practical.

A graded index lens in which both the spherical aberration and coma are corrected is described in Japanese Patent Disclosure No. 58-122512. However, a second surface of this lens has a concave shape wherein a radius of curvature $C_1$ satisfies $0.09 \leq C_1 \leq 0.14$ and the lens has a meniscus shape. Since polishing of the two surfaces in alignment with each other is not easy, the cost of the lens cannot be decreased. The lens also has a central thickness t within a range between 8 and 15 mm, and is heavier than a conventional 2-group 3-lens component lens. Thus, the advantages of light weight and compactness of a single lens are impaired.

In this manner, conventional lenses cannot satisfy requirements in a lens for an optical recording/reproducing apparatus to a degree where at least spherical aberration and coma are sufficiently corrected to high orders, the lens is compact in size, light in weight, and inexpensive.

For this reason, an optical recording/reproducing apparatus using such a lens cannot perform high-density recording/reproduction, extremely high precision in assembly of the apparatus is required, and response characteristics of an optical pickup to focusing and tracking control are poor.

OBJECTS OF THE INVENTION

It is an object of the present invention to provide a lens for an optical recording/reproducing apparatus, in which at least spherical aberration and coma are corrected sufficiently to high order, and which is compact in size, light in weight and inexpensive.

It is another object of the present invention to provide an optical recording/reproducing apparatus which can perform high-density recording/reproduction, does not require very high precision in the assembly of the apparatus, and has excellent response characteristics of an optical pickup to focusing and tracking control.

DETAILED DESCRIPTION OF THE PREFERRED EMBODIMENT

An embodiment of the present invention applied to an optical disk system and Examples 1 and 2 will be described with reference to FIGS. 2 to 4.

Figure 1:
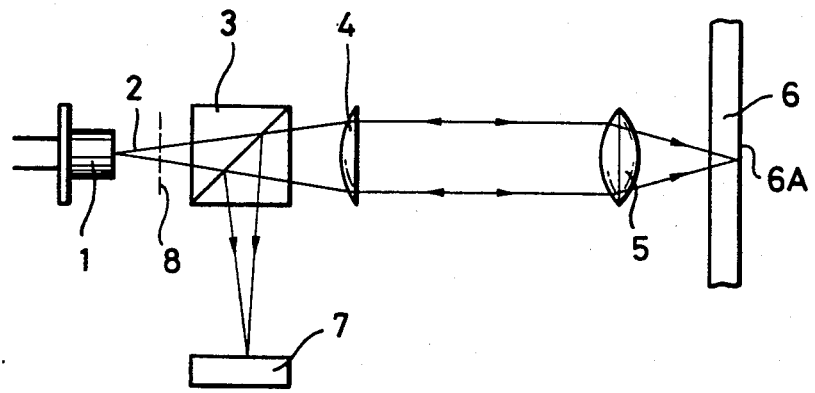
FIG. 1 is a side view showing a prior art of the present invention.
Figure 2:
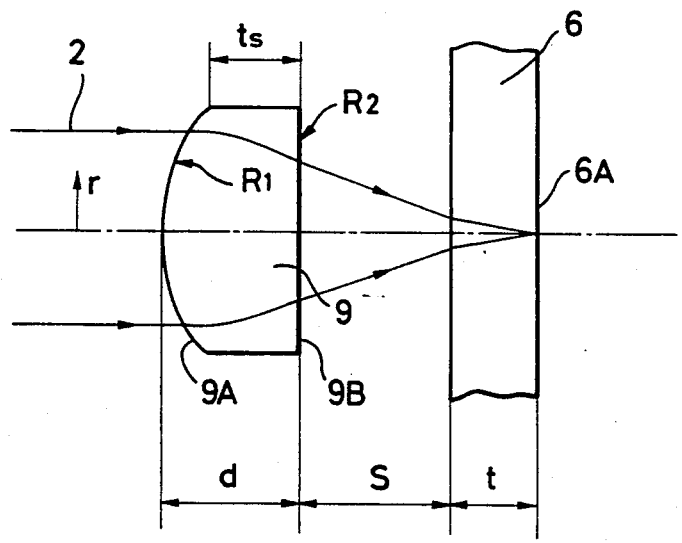
FIG. 2 is a side view showing an embodiment of the present invention.

FIG. 2 shows an embodiment of the present invention. An objective lens 9 in this embodiment has a first surface 9A having a radius of curvature $R_1$ and a second surface 9B having a radius of curvature $R_2$. The objective lens 9 has a thickness d. A refractive index n(r) of the objective lens 9 at a position a distance r from the optical axis along the radial direction is expressed by a power series given by:

$$n^2(r) = n_0^2 \{1 - (g \cdot r)^2 + h_4(g \cdot r)^4 + h_6(g \cdot r)^6 + h_8(g \cdot r)^8 + \ldots\}$$

where $n_0$ is the refractive index on the optical axis, and g, $h_4$, $h_6$ and $h_8$ are coefficients. In this embodiment, the objective lens 9 is arranged at a position of a working distance S from an optical disk 6 of a transparent medium having a thickness t.

In this embodiment, when the focal distance at the image side of the entire system including the transparent medium of the optical disk 6 is represented by f, the objective lens 9 satisfies the following conditions:

$$R_2 = \infty \quad (1)$$

$$3.0 \geq R_1/(1 + 0.75S) \geq 0.8 \quad (2)$$

$$1.40 \leq n_0 \leq 1.87 - 0.6 g \cdot S \quad (3)$$

$$0.75 \geq g \cdot f \geq 0.45 \quad (4)$$

The condition (1) must be satisfied so as to allow the objective lens 9 to have a plano-convex shape, so that the lens is easy to polish and inexpensive to produce.

The condition (2) is for limiting the size of the objective lens 9. When the sine condition is to be satisfied with the term $R_1/(1+0.75S)$ smaller than the lower limit given by the condition (2), a thickness $t_s$ of the objective lens 9, i.e., the edge thickness becomes too small. Then, polishing of the lens is difficult. If the thickness $t_s$ is kept relatively large, the deficiency amount of the sine condition is increased in the positive direction.

When the sine condition is satisfied with the term $R_1/(1+0.75S)$ exceeding the upper limit given by the condition (2), the diameter and the central thickness d of the objective lens 9 increase, so that the objective lens 9 becomes large and heavy. As a result, good response characteristics to focusing and tracking control cannot be expected.

The condition (3) is for satisfying the sine condition. When the condition (3) is not satisfied, the amount of deficiency of the sine condition increases in the positive direction to increase coma, and the field of view of the objective lens 9 is narrowed.

The condition (4) is for correcting the spherical aberration. An objective lens 9 for an optical disk system generally has a large numeral aperture, so that aberrations up to high orders must be corrected. When the term g·f is lower than the lower limit given by the condition (4), the aberration of peripheral light is undercorrected due to aberration of high order, i.e., 7th order or higher which is caused by the first surface 9A. If aberration at the periphery of the objective lens 9 is corrected, aberration at an intermediate zone between the periphery and the optical axis is increased. In any case, if the term g·f is below the lower limit given by the condition (4), the aberration cannot be corrected.

When the term g·f exceeds the upper limit given by the condition (4), the difference in refractive index at the optical axis and the periphery of the objective lens 9 is increased, resulting in aberration of 7th order or higher again. In this case, the rms value of the spherical aberration does not fall below 0.07λ.

When a suitable value of the radius of curvature $R_1$ is selected in accordance with the condition (2) and the values of $n_0$ and g satisfying the conditions (3) and (4) for the selected value of the radius of curvature $R_1$ are suitably selected, the objective lens 9 can be rendered compact in size and light in weight and the sine condition can also be satisfied. Aberration of 7th order or higher can be corrected, and the spherical aberration can also be corrected.

As a result of this, a compact, lightweight and inexpensive objective lens 9 can be obtained wherein the residual wavefront aberration is within the diffraction limit, i.e., below 0.05λ on the optical axis, the rms value within the field of view is below 0.07λ, and the central thickness d is within the range between 0.5 and 7 mm.

If the conditions (1) to (4) are satisfied, a coefficient $h_4$ satisfies:

$$1.5 \geq h_4 \geq -2$$

Instead of the conditions (2) to (4) above, if the following conditions (2)' to (4)' are satisfied:

$$2.0 \geq R_1/(1+0.75S) \geq 0.9 \quad (2)'$$

$$1.40 \leq n_0 \leq 1.83 - 0.6 g \cdot S \quad (3)'$$

$$0.61 \geq g \cdot f \geq 0.51 \quad (4)'$$

the aberration is corrected further.

Figure 3A:
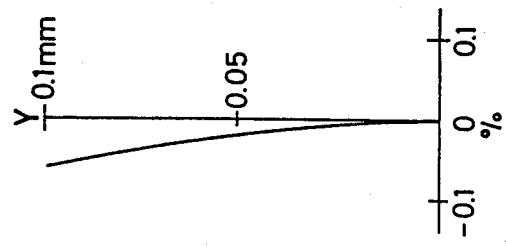
FIGS. 3 and 4 are graphs showing aberration in Examples 1 and 2.
Figure 3B:
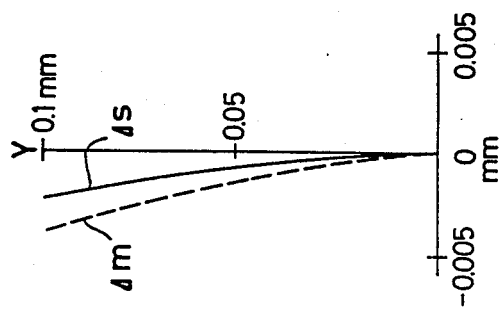
Figure 3C:
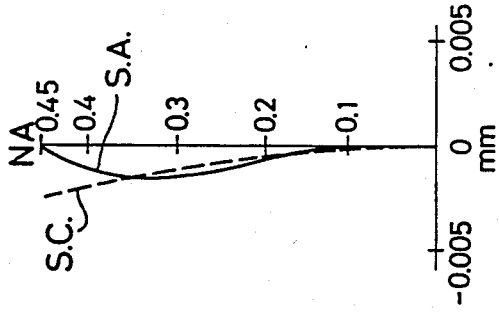
Figure 4A:
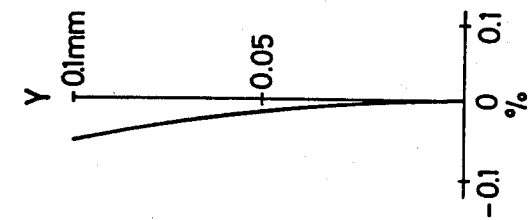
Figure 4B:
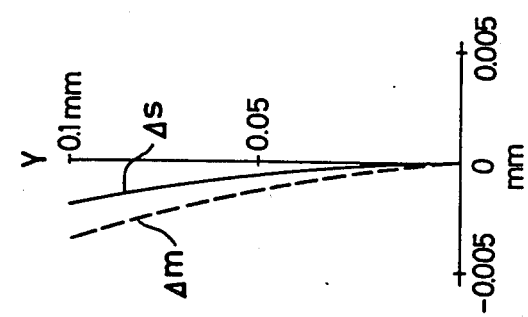
Figure 4C:
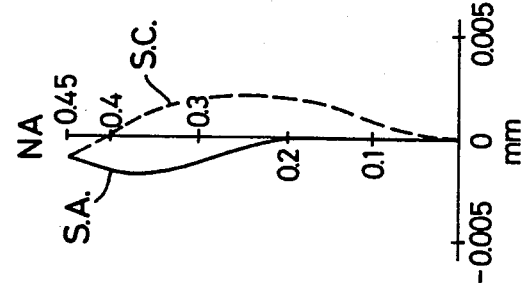

FIGS. 3 and 4 show aberration curves of Examples 1 and 2 wherein the refractive index of the transparent medium of the optical disk 6 is 1.57 and various other specifications are as given below. Solid lines in FIGS. 3A and 4A represent spherical aberration (S·A), and dotted lines therein show the deficiency amount of the sine condition (S·C). Solid lines in FIGS. 3B and 4B respectively represent astigmatism within a sagittal plane (ΔS) and dotted lines therein respectively represent astigmatism in a meridional plane (Δm). FIGS. 3C and 4C show distortion. In FIGS. 3B, C, 4B and 4C, the image height at the optical disk 6 is plotted along the Y-axis.

EXAMPLE 1

$R_1 = 2.586$ mm, $d = 1.687$ mm $n_0 = 1.58$, $g = 0.16$ mm$^{-1}$ $h_4 = -0.8$, $h_6 = -2.5$, $h_8 = 0$ $R_2 = \infty$, $S = 1.8$ mm, $f = 3.526$ mm $t = 1.2$ mm, NA at the image side $= 0.45$

EXAMPLE 2

$R_1 = 3.075$ mm, $d = 1.654$ mm $n_0 = 1.59$, $g = 0.13$ mm$^{-1}$ $h_4 = -0.64$, $h_6 = -4$, $h_8 = 0$ $R_2 = \infty$, $S = 2.6$ mm, $f = 4.319$ mm $t = 1.2$ mm, NA at the image side $= 0.45$ In Examples 1 and 2 above, a compact and light objective lens 9 for an optical disk system can be obtained wherein the diameter is below 5 mm, the thickness is below 1.7 mm, the weight is below 0.1 g, and the working distance is long. As can be seen from FIGS. 3 and 4, various types of aberration are corrected sufficiently.

As described above, in a lens for an optical recording-/reproducing apparatus of the present invention, the first surface is a convex surface, the second surface is flat, and the refractive index has a predetermined distribution. Therefore, at least the spherical aberration and coma are satisfactorily corrected, and the rms value of the residual wavefront aberration is as small as 0.07λ or less, within the field of view.

In the lens of the present invention, since the first surface is a convex surface, the numerical aperture is large and is easier to polish than an aspherical surface. Furthermore, since the second surface is flat and easy to polish, the lens is rendered less expensive.

The lens of the present invention is a single lens and its aberration is corrected sufficiently even if the diameter and central thickness are small. Therefore, the lens of the present invention is compact in size and light in weight.

An optical recording/reproducing apparatus of the present invention uses a lens as described above as an objective lens. Therefore, the apparatus of the present invention is capable of high-density recording/reproduction, does not require too high precision in assembly, and allows good response characteristics of an optical pickup to focusing and tracking control.

what is claimed is:

1. A lens for an optical recording/reproducing apparatus wherein a refractive index $n(r)$ at a position of a distance r from an optical axis along a radial direction is given by:

$$n^2(r) = n_0^2\{1 - (g \cdot r)^2 + h_4(g \cdot r)^4 + h_6(g \cdot r)^6 + h_8 + \ldots\}$$

and the following conditions are satisfied:

$$R_2 = \infty$$

$$3.0 \geq R_1/(1 + 0.75S) \geq 0.8$$

$$1.40 \leq n_0 \leq 1.87 - 0.6g \cdot S$$

$$0.75 \geq g \cdot f \geq 0.45$$

where
 $n_0$: refractive index on the optical axis
 $g$, $h_4$, $h_6$, $h_8$: coefficients
 $R_1$: radius of curvature of a first surface
 $R_2$: radius of curvature of a second surface
 S: working distance
 f: focal distance of an overall optical system at an image side.

2. A lens according to claim 1, wherein values of $n_0$, $g$, $R_1$, S and f satisfy the following conditions:

$$2.0 \geq R_1/(1 + 0.75S) \geq 0.9$$

$$1.40 \leq n_0 \leq 1.83 - 0.6g \cdot S$$

$$0.61 \geq g \cdot f \geq 0.51.$$

3. A lens according to claim 1 or 2, wherein a central thickness d satisfies:

$$0.5 \leq d \leq 7 \text{ (mm)}.$$

4. An optical recording/reproducing apparatus using a lens as an objective lens wherein a refractive index $n(r)$ at a position of a distance r from an optical axis along a radial direction is given by:

$$n^2(r) = n_0^2\{1 - (g \cdot r)^2 + h_4(g \cdot r)^4 + h_6(g \cdot r)^6 + h_8(g \cdot r)^8 + \ldots\}$$

and the following conditions are satisfied:

$$R_2 = \infty$$

$$3.0 \geq R_1/(1 + 0.75S) \geq 0.8$$

$$1.40 \leq n_0 \leq 1.87 - 0.6g \cdot S$$

$$0.75 \geq g \cdot f \geq 0.45$$

where
 $n_0$: refractive index on the optical axis
 $g$, $h_4$, $h_6$, $h_8$: coefficients
 $R_1$: radius of curvature of a first surface
 $R_2$: radius of curvature of a second surface
 S: working distance
 f: focal distance of an overall optical system at an image side.

5. An apparatus according to claim 4, wherein values of $n_0$, $g$, $R_1$, S and f satisfy the following conditions:

$$2.0 \geq R_1/(1 + 0.75S) \geq 0.9$$

$$1.40 \leq n_0 \leq 1.83 - 0.6g \cdot S$$

$$0.61 \geq g \cdot f \geq 0.51.$$

6. An apparatus according to claim 4 or 5, wherein a central thickness d satisfies:

$$0.5 \leq d \leq 7 \text{ (mm)}.$$

* * * * *

UNITED STATES PATENT OFFICE
CERTIFICATE OF CORRECTION

Patent No. 4,668,055                     Dated   May 26, 1987

Inventor(s) Nishi et al.

It is certified that error appears in the above-identified patent and that said Letters Patent are hereby corrected as shown below:

Column 5, line 55 should read as follows:

-- $n^2(r) = n_0^2 \{1 - (g.r)^2 + h_4(g.r)^4 + h_6(g.r)^6 + h_8(g.r)^8 + ...\}$ --.

Signed and Sealed this

Seventeenth Day of November, 1987

*Attest:*

DONALD J. QUIGG

*Attesting Officer*     *Commissioner of Patents and Trademarks*